United States Patent [19]
Inoue

[11] 3,882,954
[45] May 13, 1975

[54] REACTION TORQUE GENERATOR FOR VEHICLE STEERING SYSTEM

[75] Inventor: Naohiko Inoue, Yokohama, Japan

[73] Assignee: Nissan Motor Company Limited, Yokohama, Japan

[22] Filed: Mar. 26, 1974

[21] Appl. No.: 454,796

[30] Foreign Application Priority Data
Mar. 27, 1973 Japan.............................. 48-34133

[52] U.S. Cl.................................. 180/79.2; 280/94
[51] Int. Cl............................................. B62d 5/00
[58] Field of Search.................. 180/79.2 D, 79.2 R; 280/90, 94; 74/495

[56] References Cited
UNITED STATES PATENTS

| | | | |
|---|---|---|---|
| 1,841,791 | 1/1932 | Dalmace et al................... | 280/90 X |
| 2,838,125 | 6/1958 | Staude........................... | 180/79.2 D |
| 3,171,298 | 3/1965 | Henry-Biabaud.............. | 180/79.2 D |

Primary Examiner—David Schonberg

[57] ABSTRACT

A steering reaction torque is generated which is proportional to the vehicle speed and applied to the steering wheel shaft to make it harder to turn the steering wheel at high speed and thus prevent oversteering.

4 Claims, 3 Drawing Figures

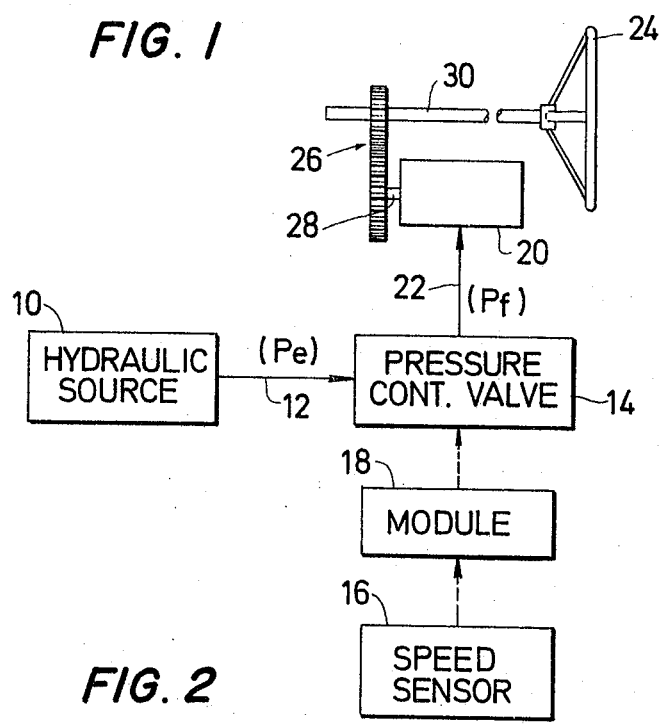
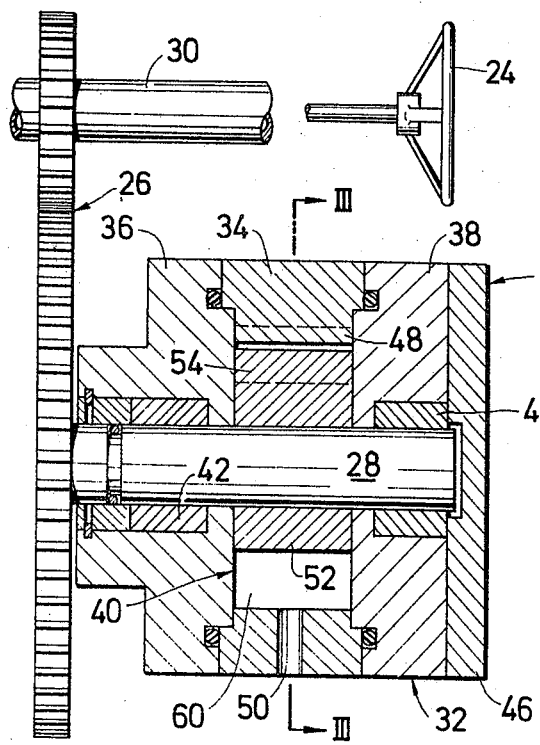

REACTION TORQUE GENERATOR FOR VEHICLE STEERING SYSTEM

The present invention relates to a power steering control system for a motor vehicle, and more particularly to the improvement of a reaction torque generator for a steering wheel.

It has heretofore been proposed to have a motor vehicle equipped with a power steering control system by which steering assistance is provided to reduce the driver effort required for steering the motor vehicle. Difficulties are encountered in that a driver encounters less resistance in turning the steering wheel at high vehicle speed and greater resistance at low vehicle speed. These difficulties result in oversteering at high speed and the need for greater steering effort at low speed.

Accordingly, various systems have been developed to overcome these difficulties. One of these systems, hereinafter described, includes a reaction torque generator which is drivably connected to the steering shaft to apply to the steering wheel reaction torque varied in accordance with vehicle speed to increase the resistance to turning the steering wheel at high vehicle speed. The reaction torque generator is actuated by hydraulic pressure controlled by a hydraulic pressure control valve. The hydraulic pressure control valve is actuated by a speed-sensitive control unit which produces an electric signal representing the speed of the motor vehicle.

In this prior art system, the reaction torque generator includes a cylindrical casing which inside is separated into two compartments with a partition vane fixed onto the outer periphery of an axial shaft which is rotatably mounted on the casing along the longitudinal axis thereof. With this construction, the torque on the shaft produced by controlling the differential pressure between the two compartments is applied to the steering shaft for providing a reaction force varied in accordance with the vehicle speed to the steering wheel.

However, since the reaction torque generator in this prior art system requires a differential pressure control mechanism in which a flow direction control valve for hydraulic fluid is movably connected to the axial shaft of the generator, the generator is inevitably of complicated configuration and high cost. These shortcomings have caused difficulty in the practical use of the system.

It is, therefore, an object of the present invention to provide an improved steering control system which applies to a steering wheel reaction torque varied in accordance with the vehicle speed for thereby increasing the resistance to turning the steering wheel with vehicle speed.

It is an another object of the present invention to provide an improved reaction torque generator which overcomes the above-mentioned shortcomings.

It is a further object of the present invention to provide an improved reaction torque generator of simplified configuration and low cost.

It is a still further object of the present invention to provide an improved reaction torque generator which does not require a differential pressure control mechanism having flow direction control valve.

These and other objects and advantages of the present invention will become more apparent from the following description when taken in conjunction with the attached drawings, in which:

FIG. 1 is a schematic block diagram of a steering control system which includes a reaction torque generator according to the present invention;

FIG. 2 is a longitudinal sectional view of a reaction torque generator according to the present invention; and FIG. 3 is a transverse sectional view taken on a line A—A in FIG. 2.

Referring to the drawings and more particularly to FIG. 1, there is shown a vehicle power steering control system incorporating a reaction torque generator of the present invention. Since the power assisted operating portions of the system do not play an important role in illustrating the present invention, they have been omitted for the purpose of simplicity. In the figure, the power steering control system includes a source 10 of hydraulic fluid under pressure such as a constant delivery pump driven by the engine of the motor vehicle (not shown). Hydraulic fluid at a pressure $P_e$ from the source 10 is supplied through a conduit 12 to a hydraulic pressure control valve 14. The hydraulic fluid at the pressure $P_e$ may be supplied through a control valve (not shown) which is responsive to the steering resistance of the front wheels (not shown) of the motor vehicle to develop a steering-assistance hydraulic pressure in accordance therewith.

The power steering control system also includes a vehicle speed sensor 16 which is responsive to the speed of the motor vehicle and produces an electric signal corresponding thereto. This electric signal is fed to a module 18 which is adapted to convert and amplify the input signal to produce an appropriate control signal, which is applied to the hydraulic pressure control valve 14 so that hydraulic fluid at the pressure $P_e$ supplied to the hydraulic pressure control valve 14 is modulated in accordance with the control signal from the module 18 to produce controlled hydraulic fluid at a pressure $P_f$ which is fed to a reaction torque generator 20 of the present invention through a hydraulic line 22. It should be noted that the module 18 may be designed such that the magnitude of the control signal produced thereby increases as the speed of the motor vehicle decreases.

The reaction torque generator 20 actuated by fluid at the regulated pressure $P_f$ applies a reaction torque to a steering wheel 24 through a reduction gear set 26 which mechanically connects the reaction torque generator 20 to the steering wheel 24. One gear of the reduction gear set 26 is fixed to an axial shaft 28 of the reaction torque generator 20 and the other is fixed to a steering shaft 30 carrying the steering wheel 24.

In FIGS. 2 and 3, there is illustrated the general construction of the reaction torque generator 20 of the present invention. The generator 20 shown therein comprises a casing 32 which includes a cylindrical enveloping body 34 with circular side walls 36 and 38. The axial shaft 28 is rotatably mounted through the side walls 36 and 38. The casing 32 defines therein a cylindrical chamber 40. The axial shaft 28 is rotatably journalled in bearings 42 and 44 in side walls 36 and 38 coaxially with the chamber 40. The one gear of the reduction gear set 26 is fixed to one end of the axial shaft 28. O-rings (no numerals) are disposed in grooves in the side walls 36 and 38 for sealing among the enveloping body 34, the side walls 36 and 38 and the shaft 28. The side wall 38 has a cap 46 fixed to the outer surface thereof for covering the end of the rotating axial shaft 28. The enveloping body 34 has a stop or projection 48 formed on its inner periphery and an opening 50 through the wall thereof for admitting hydraulic fluid from the hydraulic control valve 14 (shown in FIG. 1). The projection 48 and the opening 50 are diametrically opposed to each other. In the cylindrical chamber 40, a cylindrical sleeve or rotor member 52 is fixedly coaxially mounted on the axial shaft 28, and has a stop or projection 54 formed on the outer periphery thereof.

A pair of arcuate members 56 and 58 (see FIG. 3) are slidably and sealingly interposed between the inner periphery of the enveloping body 34 and the outer periphery of the rotor member 52. The arcuate members 56 and 58 are so arranged that both projections 48 and 52 are interposed between upper ends thereof, and an arcuate chamber 60 communicating with the hydraulic pressure control valve 14 (shown in FIG. 1) through the opening 50 is defined between lower ends 62 and 64 respectively thereof. It is to be noted that hydraulic fluid under pressure from the hydraulic pressure control valve 14 (shown in FIG. 1) acts on the lower ends 62 and 64 of the arcuate members 56 and 58.

In operation, when the steering wheel 24 is held in a neutral position for straight line cruising of the motor vehicle, the rotor member 52 of the reaction torque generator 20 is arranged to be positioned as shown in FIG. 3 by the reduction gear set 26 which mechanically connects the steering shaft 30 to the axial shaft 28 of the reaction torque generator 20. In this state, pressurized fluid admitted through the opening 50 of the enveloping body 34 acts on the ends 62 and 64 of the arcuate members 56 and 58 to force both arcuate members 56 and 58 to contact the projection 48 of the enveloping body 34. As a result the projection 54 of the rotor member 52 is held between the pair of arcuate members 56 and 58 and angularly aligned with the projection 48 to hold the steering wheel 24 in the neutral position to enhance the straight cruising stability of the motor vehicle.

When the steering wheel 24 is rotated to turn the motor vehicle, the rotor member 52 is rotated in a direction to separate one of the arcuate members 56 and 58 from the projection 48 of the enveloping body 34, thus developing a steering reaction torque from the pressure of the fluid in the arcuate chamber 60. The reaction against rotation of the rotor member 52 is transmitted to the steering shaft 30 through the reduction gear set 26. Accordingly, the driver of the motor vehicle encounters resistance in turning the steering wheel 24 which is secured to the steering shaft 30. In addition, since the pressure of the hydraulic fluid admitted into the arcuate chamber 60 is modulated to be proportional to the vehicle speed, for low vehicle speeds, the driver encounters small resistance in turning the steering wheel 24 and, on the other hand, at high vehicle speeds, a large turning resistance is provided to avoid the danger of too rapid turning of the steering wheel and the road wheels.

While the embodiment of the present invention as herein disclosed constitutes a preferred form, it is to be understood that other forms might be adopted.

What is claimed is:

1. A reaction torque generator for a steering system for a vehicle having a manually rotatable steering shaft and source means operative to supply fluid at a pressure which increases with the vehicle speed, said generator comprising:

a casing defining therein a chamber having a first stop formed on the inner surface thereof;

a shaft having a first section rotatable within said chamber and a second section sealingly extending externally through said casing for rotatable engagement with the steering shaft, said first section having a second stop formed thereon and arranged such that the steering shaft is in a position to steer the vehicle in a straight line when said first and second stops are angularly aligned; and first and second members slidably disposed in said chamber, each being exposed at one end thereof to fluid from the source means, said first member being engagable at its other end with the sides of said first and second stops facing in one direction about the axis of said shaft and said second member being engagable with the sides of said first and second stops facing in the opposite direction about the axis of said shaft to urge said second stop toward angular alignment with said first stop.

2. A generator according to claim 1, in which said first and second members are arcuate and are sealingly and rotatably slidable between said shaft and the inner surface of said chamber.

3. A generator according to claim 2, in which said shaft is coaxially rotatable within said chamber.

4. A generator according to claim 1, in which said second stop is formed on a sleeve coaxially rotatable with said shaft.

* * * * *